US010210390B2

(12) United States Patent
Couzinier et al.

(10) Patent No.: US 10,210,390 B2
(45) Date of Patent: Feb. 19, 2019

(54) INSTALLATION OF A PHYSICAL ELEMENT

(71) Applicant: Accenture Global Solutions Limited, Dublin (IE)

(72) Inventors: Nicolas Couzinier, Toulouse (FR); Manuel Montaigne, La Salvetat Saint Gilles (FR)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 15/455,256

(22) Filed: Mar. 10, 2017

(65) Prior Publication Data
US 2017/0330035 A1 Nov. 16, 2017

(30) Foreign Application Priority Data

May 13, 2016 (EP) ..................................... 16290081

(51) Int. Cl.
*G06T 19/00* (2011.01)
*G06K 9/62* (2006.01)
*G06F 3/01* (2006.01)
*G06K 9/00* (2006.01)

(52) U.S. Cl.
CPC .......... *G06K 9/00671* (2013.01); *G06F 3/011* (2013.01); *G06K 9/6215* (2013.01); *G06T 19/006* (2013.01)

(58) Field of Classification Search
None
See application file for complete search history.

(56) References Cited

U.S. PATENT DOCUMENTS

| 9,299,013 | B1 | 3/2016 | Curlander et al. |
| 9,477,888 | B1* | 10/2016 | Lewis ..................... G06T 11/60 |
| 9,779,512 | B2* | 10/2017 | Tomlin .................... G06T 15/04 |
| 2012/0007852 | A1* | 1/2012 | Morate ................ G06T 19/006 |
| | | | 345/419 |

(Continued)

FOREIGN PATENT DOCUMENTS

| DE | 102011015987 | 10/2012 |
| WO | WO 2007/038740 | 4/2007 |
| WO | WO 2011/056196 | 5/2011 |

OTHER PUBLICATIONS

Extended European Search Report corresponding to EP 16290081. 5, dated Oct. 31, 2016, 10 pages.

(Continued)

*Primary Examiner* — Andrew G Yang
(74) *Attorney, Agent, or Firm* — Harrity & Harrity, LLP

(57) ABSTRACT

A computer-implemented method, a computer program product and a computer system for installing a first physical element on or in a second physical element are provided. The method comprises receiving, by an augmented reality system, an indication of at least one of the first physical element and the second physical element. The method further comprises loading, by the augmented reality system and using the indication, a model of the second physical element. The method further comprises recognizing, by the augmented reality system, the second physical element based on the model. The method further comprises projecting, by the augmented reality system, an image corresponding to the first physical element on or in the second physical element.

20 Claims, 3 Drawing Sheets

(56) References Cited

U.S. PATENT DOCUMENTS

| | | | |
|---|---|---|---|
| 2012/0212509 A1* | 8/2012 | Benko | G03B 35/00 |
| | | | 345/633 |
| 2014/0160115 A1 | 6/2014 | Keitler et al. | |
| 2014/0267411 A1* | 9/2014 | Fein | G06T 11/00 |
| | | | 345/633 |
| 2014/0267662 A1* | 9/2014 | Lampo | G06F 19/324 |
| | | | 348/77 |
| 2015/0062120 A1* | 3/2015 | Reisner-Kollmann | |
| | | | G06T 19/006 |
| | | | 345/419 |
| 2015/0097676 A1* | 4/2015 | Liu | H01L 22/26 |
| | | | 340/584 |
| 2015/0170260 A1* | 6/2015 | Lees | G06Q 30/0643 |
| | | | 705/27.2 |
| 2016/0005263 A1* | 1/2016 | Keilwert | G07F 17/3211 |
| | | | 463/33 |
| 2017/0316610 A1* | 11/2017 | Lin | G06T 19/006 |

OTHER PUBLICATIONS

Markus Funk et al., "Stop helping me—I'm bored!", Sep. 7, 2015, 5 pages, XP058074125.

Markus Funk et al., "Using In-Situ Projection to Support Cognitively Impaired Workers at the Workplace", Oct. 26, 2015, 8 pages, XP058077063.

Christopher Cyr et al., "A Similarity-Based Aspect-Graph Approach to 3D Object Recognition", 2003, 27 pages.

\* cited by examiner

INSTALLATION OF A PHYSICAL ELEMENT

RELATED APPLICATION

This application claims priority under 35 U.S.C. § 119 to European Patent Application No. 16290081.5, filed on May 13, 2016, the content of which is incorporated by reference herein in its entirety.

TECHNICAL FIELD

The technical field of the present application is installation and/or assembly with the assistance of an augmented reality system. More specifically, aspects of the application relate to a method for installing a first physical element on or in a second physical element. Further aspects of the application relate to a computer program product that performs operations according to the method and an augmented reality system for installing a first physical element on or in a second physical element.

BACKGROUND

Conventionally, installing a first physical element on or in a second physical element can be a complex and error-prone process. This is particularly the case when the first physical element is smaller or significantly smaller than the second physical element, or the second physical element is a complex device with many components and the first physical element is a small part of the complex device.

For example, the second physical element may be a large device with many holes or recesses in which a first physical element may be placed. Potential installation locations for the first physical element on the second physical element may look substantially similar. Accordingly, it may be difficult for a human user to determine where to install the first physical element on the second physical element.

For example, the second physical element could be an engine, upon which several electrical and mechanical components must be installed. The first physical element could be a wire, to be installed on the second physical element according to a specified path.

In other situations, the second physical element may have a flat surface or the second physical element may be a container. Accordingly, it may be difficult for the user to determine where or how to arrange a first physical element with respect to the second physical element.

Conventionally, an installation method is performed by a trained technician according to complex documents. For example, the documents may specify specific locations for hundreds or even thousands of components each of which must be placed in the correct location and in the appropriate way (e.g. rotated two turns counterclockwise) in order for the device to function properly. Alternatively, the documents may specify a particular way of arranging components within a container, so that a maximum number of components or elements can be placed within the container.

Moreover, it may be difficult for the user to place a first physical element on or in a second physical element, while at the same time consulting documents or a hand-held display indicating where the first physical element should be placed with respect to the second physical element. Accordingly, it may be desirable for the user to be able to keep his hands free. Further, it may be a problem to reduce the time and training required to install a first physical element on or in a second physical element.

In addition, in view of the difficulty and complexity involved in correct installation, particularly when many (first or including the first) physical elements need to be installed in similar locations on another (second) physical element, it may be a problem to improve accuracy of installation.

SUMMARY

According to an aspect, a computer implemented method for installing a first physical element on or in a second physical element is provided. The method comprises receiving, by an augmented reality system, an indication of at least one of the first physical element and the second physical element. In other words, the augmented reality system receives an indication of the first physical element, or the augmented reality system receives an indication of the second physical element, or the augmented reality system receives an indication of both the first physical element and the second physical element.

The method further comprises loading, by the augmented reality system and using the indication, a model of the second physical element. For example, a storage or storage device may be accessed in order to retrieve the model of the second physical element. The storage may be a part of the augmented reality system.

The method further comprises recognizing, by the augmented reality system, the second physical element based on the model. The recognizing may involve finding and/or identifying the second physical element based on the model. In other words, the model may be used to recognize the second physical element. The recognizing may be performed in the context of manufacturing or an assembly line. Thus, a model of the second physical element may be loaded and recognized at the beginning of the assembly process and then other elements (including the first physical element) may be installed on or in the second physical element.

The method further comprises projecting, by the augmented reality system, an image corresponding to the first physical element on the second physical element. In other words, the augmented reality system displays the image corresponding to the first physical element on the second physical element.

Installing a physical element according to the teaching of the present application may require less training for a user and result in improved accuracy of installation (e.g., the first physical element is more likely to be installed in the correct location and positioned correctly with respect to the second physical element) in comparison to conventional approaches.

The method may comprise one or more of the following, in various combinations.

In some cases, the step of receiving the indication by the augmented reality system comprises scanning a machine readable representation of a code.

The machine readable representation may be a bar code of a work order. For example, receiving the indication may comprise scanning the bar code. Alternatively, the machine readable representation may be a QR code or another machine readable representation of data.

The first physical element and the second physical element may be associated within the work order. Alternatively, a known location or a location specified in the work order may be accessed in order to determine the first physical element and/or the second physical element. For example, the work order may include a link to the location, and a location may provide a storage specifying the second physical element and a list of elements to be installed on the second physical element, wherein the list of elements includes the first physical element.

The method may further comprise validating, by the augmented reality system, whether the first physical element has been correctly installed on the second physical element.

Moreover, the method may comprise arranging a plurality of physical elements, including the first physical element and the second physical element, in a working space. The working space may be an area in which the user can carry out tasks. The working space may be an industrial space, e.g. a manufacturing plant or an assembly line. In some cases, the working space may be part of a building, such as a room within the building. The physical elements may be laid out within the working space, or they may be brought into the working space as they are needed.

The method may further comprise providing storage that stores a plurality of models, the models including a model of the first physical element and the model of the second physical element. The storage may be implemented as computer data storage, or memory. The storage may include computer components and recording media for retaining digital data. The storage may be implemented as a remote server or part of a remote server. The storage may be implemented as disk storage, e.g. a disk drive.

The loading may comprise using the indication of one of the physical elements to determine the other physical element by means of a stored association between the physical elements.

For example, the storage may include a link between the first physical element and the second physical element, e.g. a part number or serial number of the first physical element may be linked to a part number or serial number of the second physical element. Links between physical elements may be stored in a database. Alternatively, the work order may include associations between physical elements. For example, the work order indicating that the first physical element should be installed on the second physical element may include the stored association between the first physical element and the second physical element.

The indication may comprise a code (e.g. the bar code discussed above) linked to the first physical element and/or the second physical element. The code may be linked to the second physical element by being associated with the model of the second physical element. The code may be linked to the first physical element by being associated with the model of the first physical element. In particular, rather than being linked to the physical elements themselves, the code may be linked to one or more of the models of the physical elements.

In some cases, the images of all physical elements to be installed (including the first physical element) are projected on the surface of the second physical element. There may be at least 5, at least 10, at least 15, at least 20 or at least 25 elements to be installed.

The method may further comprise displaying, by the augmented reality system, instructions for installing the first physical element on the second physical element. In particular, the instructions for installing the first physical element on the second physical element may be displayed on a portable device. This displaying step may be carried out as part of or after the step of projecting the image corresponding to the first physical element on the second physical element.

The instructions for installing may include steps for arranging the first physical element on the second physical element. The instructions may also include steps to be carried out before arranging the first physical element on the second physical element as well as steps to be carried out after arranging the first physical element on the second physical element. Thus, installing the first physical element on the second physical element may include arranging the first physical element on the second physical element as well as additional steps to be performed before and after arranging the first physical element on the second physical element.

The method may further comprise recognizing, by the augmented reality system, the first physical element. This step may be carried out after recognizing the second physical element and before projecting the image. Alternatively, the first physical element may be recognized before the second physical element.

Moreover, the indication may comprise an indication of only the first physical element (and not the second physical element). Accordingly, the method may comprise retrieving a stored association between the first physical element and the second physical element. This step may be carried out when there are many physical elements to be installed on a single second physical element, and the first physical element is one of the many physical elements.

Further, receiving the indication of at least one of the first physical element and the second physical element may comprise recognizing, by the augmented reality system, the second physical element. Receiving the indication may further comprise retrieving a stored association between the first physical element and the second physical element. The step may be carried out when there is only one first physical element to be installed on the second physical element, or only a few (e.g. 5 or less) physical elements to be installed are the second physical element. The first physical element may be one of the few physical elements to be installed on the second physical element.

Recognizing the first physical element via the augmented reality system may comprise determining that the user is touching the first physical element or an image of the first physical element, and/or determining that a representation (e.g. including a corresponding image) of the first physical element corresponds to a model of the first physical element. The image of the first physical element used to recognize the first physical element may be a reference image that is projected in the working space but not on the second physical element.

Recognizing the second physical element by the augmented reality system may further comprise determining that the user is touching the second physical element. Alternatively, the second physical element may be automatically recognized without user intervention.

The representation of one or more of the physical elements may include an image.

Determining that the representation of a respective one of the physical elements corresponds to the model of the respective one of the physical elements may comprise capturing the representation of the respective one of the physical elements via a sensor. Determining the correspondence between the representation of a respective one of the physical elements and the corresponding model of the respective one of the physical elements may further comprise determining that the representation of the respective one of the physical elements has a predetermined degree of similarity to the model of the respective one of the physical elements. The predetermined degree of similarity may also be determined based on aspects of the model of the respective one of the physical elements or parts of the model.

Determining that the representation of the respective one of the physical elements has the predetermined degree of similarity to the model of the respective one of the physical elements may comprise determining an aspect graph of the respective one of the physical elements and comparing the determined aspect graph to a stored aspect graph corresponding to the respective one of the physical elements. Alternatively, an appearance based method may be used to compare a captured or acquired representation of the respective one of the physical elements to a stored representation of the respective one of the physical elements. In this context, references to respective ones of the physical elements refers to either the first physical element or the second physical element.

The augmented reality system may comprise one or more of the following components:
a portable device (e.g. the portable device mentioned above),
a projector capable of projecting images onto a surface,
a sensor capable of recognizing physical elements,
a computer or server capable of storing and loading models of elements along with other data processing tasks.

A single device may be capable of performing multiple functions. For example, one device may be capable of functioning as a sensor and a projector. It is also possible that the portable device, projector and sensor are combined in one device.

Alternatively, it may be advantageous to provide projector and sensor functionality in separate devices. For example, separate devices may be able to capture and project images from different angles or perspectives at the same time.

The portable device may be wearable by the user. This may have the effect of enabling the user's hands to be kept free, which may make it easier to install the first physical element on or in the second physical element. In particular, the portable device may be smart eyewear or a smart watch. Smart eyewear may be implemented as smart glasses. The portable device may also be implemented as a smartphone or a tablet. The portable device may include a processor, memory, and a display.

The portable device may host one or more applications. The portable device may include voice or speech recognition capability to facilitate user interaction with the augmented reality system.

The components of the augmented reality system may be capable of electronic communication with each other. For example, one component, a plurality or all of the components may be capable of communicating via WiFi and/or Bluetooth.

The projector may be optical and/or digital. The projector may include a laser and/or an LED.

The sensor and the projector may be combined in a single device. Alternatively, the sensor may include a further projector, such as an LED pattern projector.

The sensor may include a stereo camera.

The second physical element may be larger than the first physical element. In particular, the second physical element may be significantly larger than the first physical element. For example the second physical element may be one hundred times the size, fifty times the size, or twenty-five times the size of the first physical element.

The model of the first physical element and/or the model of the second physical element may have one or more of the following characteristics:
suitable for use by the augmented reality system to recognize one of the physical elements,
three dimensions,
vector-based and/or raster graphics.

The model of the first physical element and/or the model of the second physical element may convey at least one of the following with regard to the physical element to which the model corresponds: support for mechanical surfacing, underlying materials, dimension measurements, kinematics, functional tolerances.

A model of a respective physical element may be understood to represent or correspond to the respective physical element. At least one of the models may be a computer-aided three dimensional interactive application (CATIA). In particular, a plurality of the models or all of the models may be CATIA models.

A shape of the image projected by the augmented reality system may graphically describe the first physical element. In other words, the shape of the projected image may portray or represent the first physical element. A location of the projected image may correspond to a predetermined installation location for the first physical element. In other words, the location of the projected image may be a correct installation location for the first physical element in or on the second physical element. The predetermined installation location may be provided in one of the models, e.g. the model of the first physical element and/or the model of the second physical element. Alternatively, the predetermined installation location may be listed in the work order.

Validating whether the first physical element has been installed correctly may comprise receiving, by the augmented reality system, an indication from the user that the first physical element has been installed. The indication from the user may be a voice command. Alternatively, the user may physically interact with the augmented reality system e.g. the user may push a button. Validating whether the first physical element has been installed correctly may further comprise recognizing, by the augmented reality system, that the first physical element is in a predetermined location in or on the second physical element. The predetermined location may be the predetermined installation location for the first physical element.

Each physical element may have mass and measurable physical properties.

The second physical element may be one of the following:
an artificial satellite intended for space flight, or part of an artificial satellite,
a vehicle or part of a vehicle, or in a vehicle maybe a car,
a robot,
a box,
an electronic controller or part of a controller.

The electronic controller may be a board or part of a panel. The second physical element may have a size and weight such that it can be carried by a wheeled vehicle, such as a fork lift, a car or a truck. The second physical element may be too heavy for the user to lift unaided.

The first physical element may be one of the following:
a component, part or piece of the second physical element;
an item to be placed within the second physical element.

The first physical element may have a size and weight such that the user can hold or carry the first physical element.

Installing the first physical element on the second physical element may be part of a process of assembling the second physical element. After installation, the first physical element may perform one of more functions in connection with other parts of the second physical element. For example, if the second physical element is an artificial satellite intended for space flight, then the first physical element may be a part of the artificial satellite. The first physical element may perform a specific function of the artificial satellite once assembly of the artificial satellite has been completed.

Alternatively, the first physical element may act in combination with other physical elements to perform a function of the artificial satellite.

The method may further comprise inserting, by the user, the first physical element in a recess of the second physical element, and/or placing, by the user, the first physical element on a surface of the second physical element. In particular, the recess of the second physical element may be the predetermined installation location in or on the second physical element. Similarly, the surface of the second physical element, or a particular part of the surface of the second physical element may be the predetermined installation location.

According to another aspect, a computer program product is provided. The computer program product comprises computer readable instructions, which, when loaded and executed on a computer system, cause the computer system to perform operations according to one or more of the method steps discussed above.

According to yet another aspect, an augmented reality system for installing a first physical element on or in a second physical element is provided. The augmented reality system comprises a portable device configured to receive an indication of at least one of the first physical element and the second physical element. The augmented reality system further comprises a storage configured to store a model of the second physical element. The augmented reality system further comprises a processor configured to load, using the indication, the model of the second physical element from the storage. The augmented reality system further comprises a sensor configured to recognize the second physical element based on a model. The sensor may be further configured to validate whether the first physical element has been correctly installed on the second physical element. The augmented reality system also comprises a projector configured to project an image corresponding to the first physical element in or on the second physical element.

Components of the augmented reality system, including the portable device, the storage, the processor, the sensor, and the projector, may be implemented on separate devices or may be combined. For example, the projector and the sensor may be implemented on the same device, and/or the processor and the storage may be implemented on the same device. It is also possible that the portable device includes the storage, the processor, the sensor, and the projector.

Technical Definitions

A working space may be a physical real world environment. For example, the working space may be inside of a building, e.g. a room within the building.

An augmented reality system may provide a live direct view of a working space or an indirect video (or image) view of the working space. The elements of the live direct view or the indirect video view are supplemented by computer generated input such as sound, video, graphics and/or global positioning system (GPS) data.

The augmented reality system may include at least one of the following: a color display, a microphone, a WIFI transmitter/receiver, a Bluetooth transmitter/receiver, a battery, speech recognition. The augmented reality system may include a portable device, a projector capable of projecting images onto a surface, a sensor capable of recognizing physical elements. The portable device of the augmented reality system may be implemented via smart eyewear, e.g. B6 smart glasses M100.

A physical element may be an item or object. The first physical element and the second physical element may be any objects such that the first physical element can be installed on the second physical element.

The portable device may also be referred to as a mobile device.

A work order may also be referred to as a job order, job ticket, or work ticket, as the work order often has some type of ticket attached. The work order may be received by an organization (such as a manufacturer) from a customer or client, or maybe an order created internally within the organization. The work order may be for products or services. Specifically, the work order may contain information about installing one or more physical elements on another physical element, e.g. as part of a manufacturing process, requested by the customer. The work order may be an internal document used in projects, manufacturing, building and fabrication businesses. The work order may relate to products and/or services. The work order may be used to signal the start of a manufacturing process and may be linked to a bill of materials. The work order may include information on at least one of the following: quality of the product to be manufactured, built or fabricated, the amount of raw material to be used, the types of operations required, a machine utilization for each machine during the process. If the work order relates to a service, the work order may record the location, date and time the service operations are to be carried out, and the nature of the service that is to be carried out.

The subject matter described in this application can be implemented as a method or on a device, possibly in the form of one or more computer program products. The subject matter described in the application can be implemented in a data signal or on a machine readable medium, where the medium is embodied in one or more information carriers, such as a CD ROM, a DVD ROM, a semiconductor memory, or a hard disk. Such computer program products may cause a data processing apparatus to perform one or more operations described in the application.

In addition, subject matter described in the application can be implemented as a system including a processor, and a memory coupled to the processor. The memory may encode one or more programs to cause the processor to perform one or more of the methods described in the application. Further subject matter described in the application can be implemented using various machines.

Details of one or more implementations are set forth in the exemplary drawings and description below. Other features will be apparent from the description, the drawings, and from the claims.

DETAILED DESCRIPTION

In the following text, a detailed description of examples will be given with reference to the drawings. It should be understood that various modifications to the examples may be made. In particular, one or more elements of one example may be combined and used in other examples to form new examples.

Figure 1:
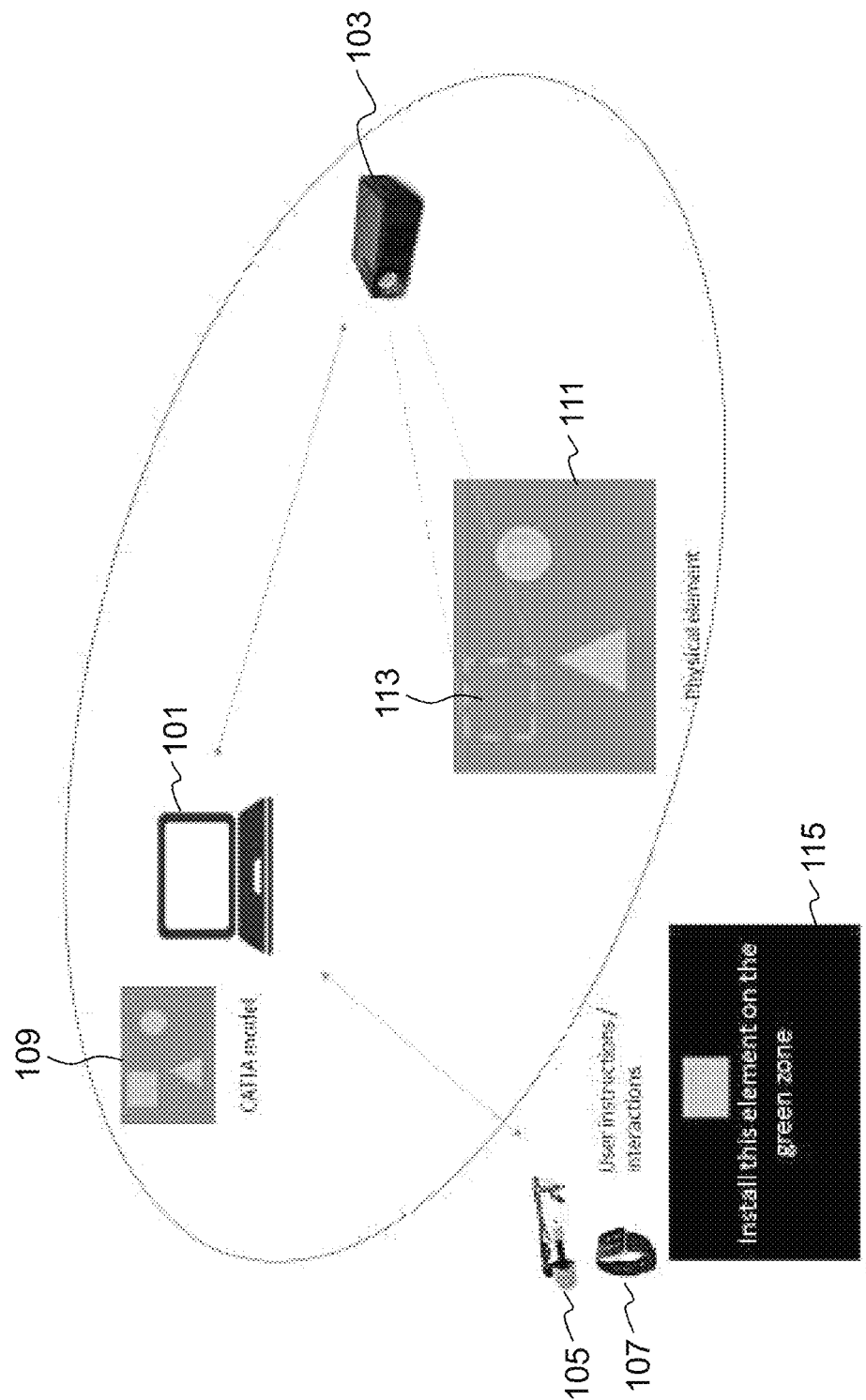
FIG. 1 depicts a simplification of an installation of a first physical element on or in a second physical element.

FIG. 1 depicts components of an augmented reality system for installing a first physical element on or in a second physical element and interactions between the components. The components of the augmented reality system include a computer 101 a projector 103 and a portable device. In the example of FIG. 1, the portable device is depicted as smart glasses 105 and smart watch 107. The smart glasses 105 and the smart watch 107 may be used alone or in combination as the portable device. The computer 101 may include storage (e.g. a storage device such as flash memory or a hard disk) and a processor.

The storage may store a model 109. The capacity of the storage may be measured in Gigabytes, hundreds of Gigabytes or Terabytes. The model may be implemented as a CATIA model. However, any model format suitable for providing a similar level of information about the shapes of physical elements and their relative positions with respect to each other could be used.

The computer 101 may receive an indication of a first physical element and/or a second physical element from the portable device, e.g. the smart glasses 105 or the smart watch 107. In response to receipt of the indication, the computer 101 may load the model 109. The model 109 may include the model of the second physical element. In addition or alternatively, the model 109 may include a model of the first physical element.

Based on the model 109, a sensor may be configured to recognize the second physical element 111. The sensor may be implemented as part of the projector 103 or may be separately implemented. Accordingly, the projector may project an image 113 corresponding to the first physical element in or on the second physical element 111. Instructions 115 may be displayed to the user on the portable device. For example, the instructions 115 may be displayed on the smart glasses 105 of the smart watch 107. The instructions 115 may specify how the user should install the first physical element on the second physical element. For example, the instructions 115 may specify one or more of the following:
 a way of arranging the first physical element in or on the second physical element,
 an angle at which the first physical element should be held at when placed in or on the second physical element,
 a feature or characteristic of the first physical element that should be pointing upwards or downwards when the first physical element is placed in or on the second physical element.

According to a specific example, the sensor may be implemented as an Ensenso N35 camera. Alternatively, the sensor may be implemented via another stereo camera with similar precision (e.g. millimeter) and resolution. In particular, the sensor should have sufficient precision and resolution to be able to recognize the second physical element 111.

After the user places the first physical element in or on the second physical element, i.e. after the first physical element is arranged or laid on or in the second physical element, the augmented reality system may validate whether the first physical element has been correctly installed in or on the second physical element. For example, the user may issue a voice command to the augmented reality system, e.g. to the smart glasses 105. The smart glasses 105 may communicate with the sensor, e.g. via the computer 101.

The augmented reality system may then recognize whether the first physical element is located at a predetermined installation location in or on the second physical element. In particular, the sensor may capture an image of the first physical element and at least part of the second physical element 111. The sensor may then send the image to the computer 101. The computer 101 may determine whether the first physical element has been correctly installed and the send an indication regarding correct/incorrect installation to the smart glasses 105.

Figure 2:
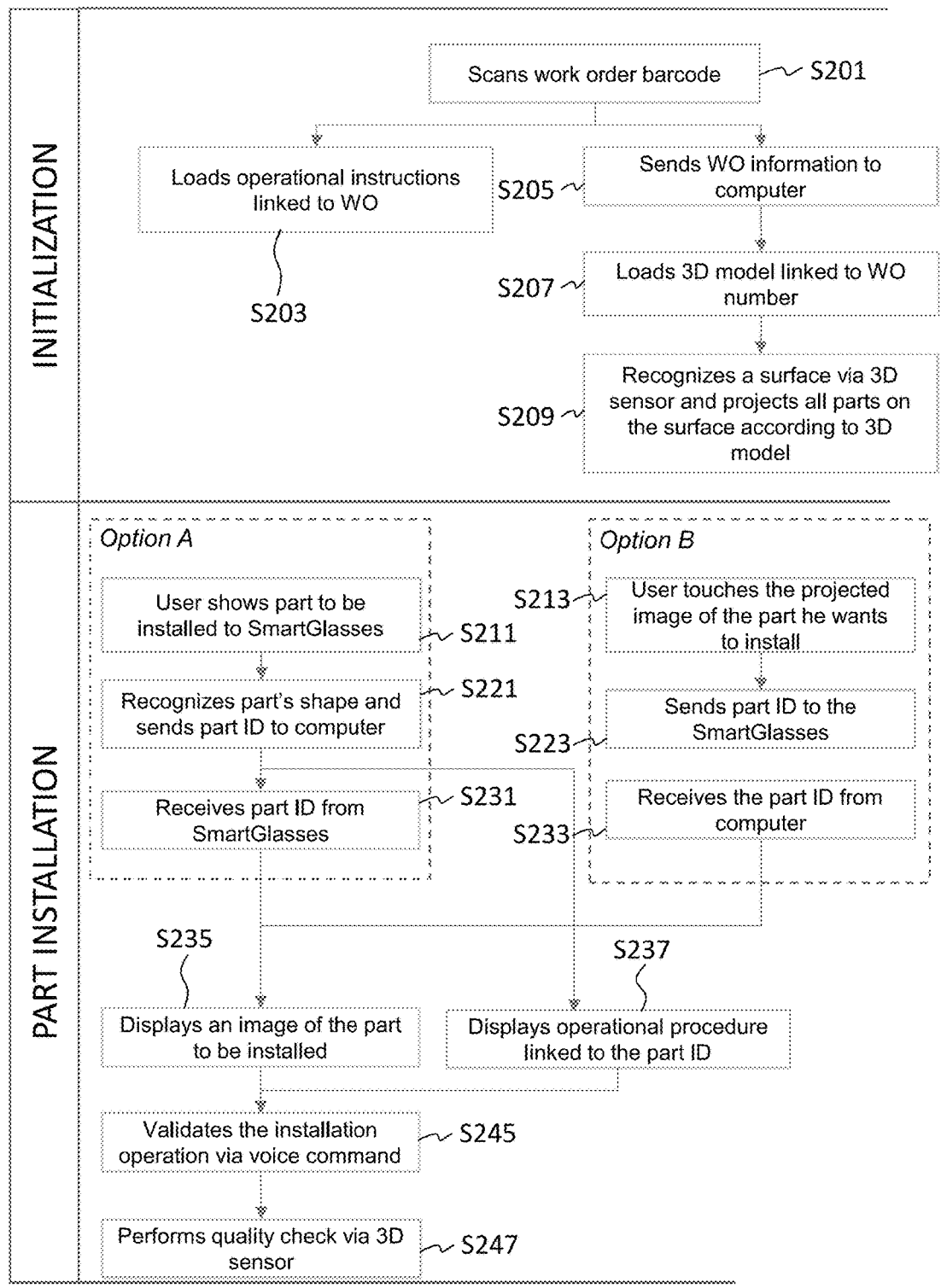
FIG. 2 shows a flow diagram of steps for installing the first physical element on or in the second physical element.

FIG. 2 shows steps of a method for installing the first physical element in or on the second physical element 111.

Before steps S201 or S203 are carried out, a plurality of physical elements, including the first physical element and the second physical element 111, may be arranged in a working space.

At step S201, the augmented reality system receives an indication of at least one of the first physical element and the second physical element. In particular, the smart glasses 105 may be used to scan a work order bar code. It should be noted that although the smart glasses 105 are referred to in the context of FIG. 2, other implementations of the portable device may be used. For example, the smart watch 107 or a smartphone could also be used. Further, although the description of FIG. 2 refers to scanning a work order bar code, some other machine readable representation could also be used At step S203, the smart glasses 105 load operational instructions (i.e. work order information) linked to the work order (WO).

At step S205 the work order information may be sent to the computer 101. The work order information may include an identifier for the model 109 or a storage location for the model 109. In addition, or alternatively, the work order information may include a link to a stored association between the first physical element, the second physical element 111, and optionally, further physical elements. The work order information may also include instructions or other information relevant to installing the first physical element in or on the second physical element 111.

At step S207, the model 109 may be loaded. The model 109 may be a 3D model linked to the work order. The model 109 may be loaded based on the indication of at least one of the first physical element and the second physical element 111 included in the work order.

At step S209, the sensor recognizes a surface of the second physical element 111 and projects all elements (e.g. components) to be installed on the second physical element 111 according to the model 109. In other words, all elements to be installed (including the first physical element) are displayed on the second physical element 111 according to the model 109. In the context of the present example, the first physical element is one of many physical elements to be installed on the second physical element 111. Steps S201 to S209 may be considered part of an initialization phase. Accordingly, steps S201 to S209 may be performed only once for the installation of many elements.

At step S211, a user may show an element (e.g. the first physical element) to the smart glasses 105. The first physical element may be a part to be installed.

At step S221, the smart glasses 105 recognize that the first physical element (i.e. the representation of the first physical element) corresponds to the model 109. Accordingly, the smart glasses 105 may determine that a representation of the part to be installed, i.e. the first physical element, corresponds to the model 109. In particular, the smart glasses 105 recognize that the shape of the first physical element corresponds to the shape of the model of the first physical element in the model 109. In the context of the example, the model

109 may be understood to include the model of the first physical element and the model of the second physical element. The models of the physical elements may also be stored and/or processed separately.

At step S231, the computer 101 receives an identification of the first physical element from the smart glasses 105.

Steps S213, S223, and S233, may be considered as an alternative to steps S211, S221, and S231. In other words, referring to FIG. 2, either the steps of option A (S211, S221, S231) or the steps of option B (S 213, S223, S233) may be performed.

At step S213, the user may touch a projected image of the physical element to be installed. In particular, since the images of all physical elements to be installed are projected on the surface of the second physical element, it is possible for the user to select any one of the projected images as the element to be installed. The sensor will then recognize the first physical element since the user is touching the first physical element. In particular, the sensor may include a depth sensing camera and computer vision software. Every image projected onto the surface of the second physical element 111 becomes a controller. Touching one of the images causes an event to be generated. By means of the event, the sensor identifies the physical element corresponding to the image that the user touched.

At step S223, the sensor communicates the information regarding the image touched to the computer 101, which then sends an identifier of the first physical element to the smart glasses 105.

At step S233, the smart glasses receive the identifier of the first physical element from the computer 101.

As an alternative to the initialization steps S201 to S209, receiving the indication of at least one of the first physical element and the second physical element may comprise recognizing, by the smart glasses 105, the first physical element. Accordingly, a stored association between the first physical element and the second physical element may be retrieved in order to identify the second physical element.

Step S221, which includes recognizing the first physical element. Step S221 may include capturing the representation of the first physical element via the smart glasses 105 or the sensor. The representation of the first physical element may include an image. Determining that the representation of the first physical element corresponds to the model of the first physical element may include determining whether the representation of the first physical element has a predetermined degree of similarity to the model of the first physical element. Determining the predetermined degree of similarity may be carried out via aspect graphs, appearance based methods, or other methods (see "A Similarity-Based Aspect-Graph Approach to 3D Object Recognition", Cyr et al., 2003).

At step S235, the image 113 corresponding to the first physical element is projected onto the second physical element 111. The image 113 may correspond to the first physical element in the sense that the image 113 has a shape roughly similar to the shape of the first physical element. The image 113 may be a low resolution and/or monocolor representation of the first physical element.

Optionally, step S237 may also be carried out. Step S237 includes displaying, via the smart glasses 105, instructions for installing the first physical element on or in the second physical element 111.

At step S245, the smart glasses 105 may validate whether the first physical element has been correctly installed in or on the second physical element 111. The validation step may be triggered via a voice command of the user.

At step S247, a quality check may be carried out via the 3D sensor.

The quality check may result in an indication of how well the first physical element has been installed (e.g. how close the first physical element is to the correct position and/or location).

The steps described above may be carried out in the context of manufacturing or an assembly line. For example, the second physical element 111 may be recognized at an initial stage of an assembly process. A number of physical elements (e.g. dozens), including the first physical element, may then be installed on the second physical element 111 by various users at different points in the assembly process.

Figure 3:
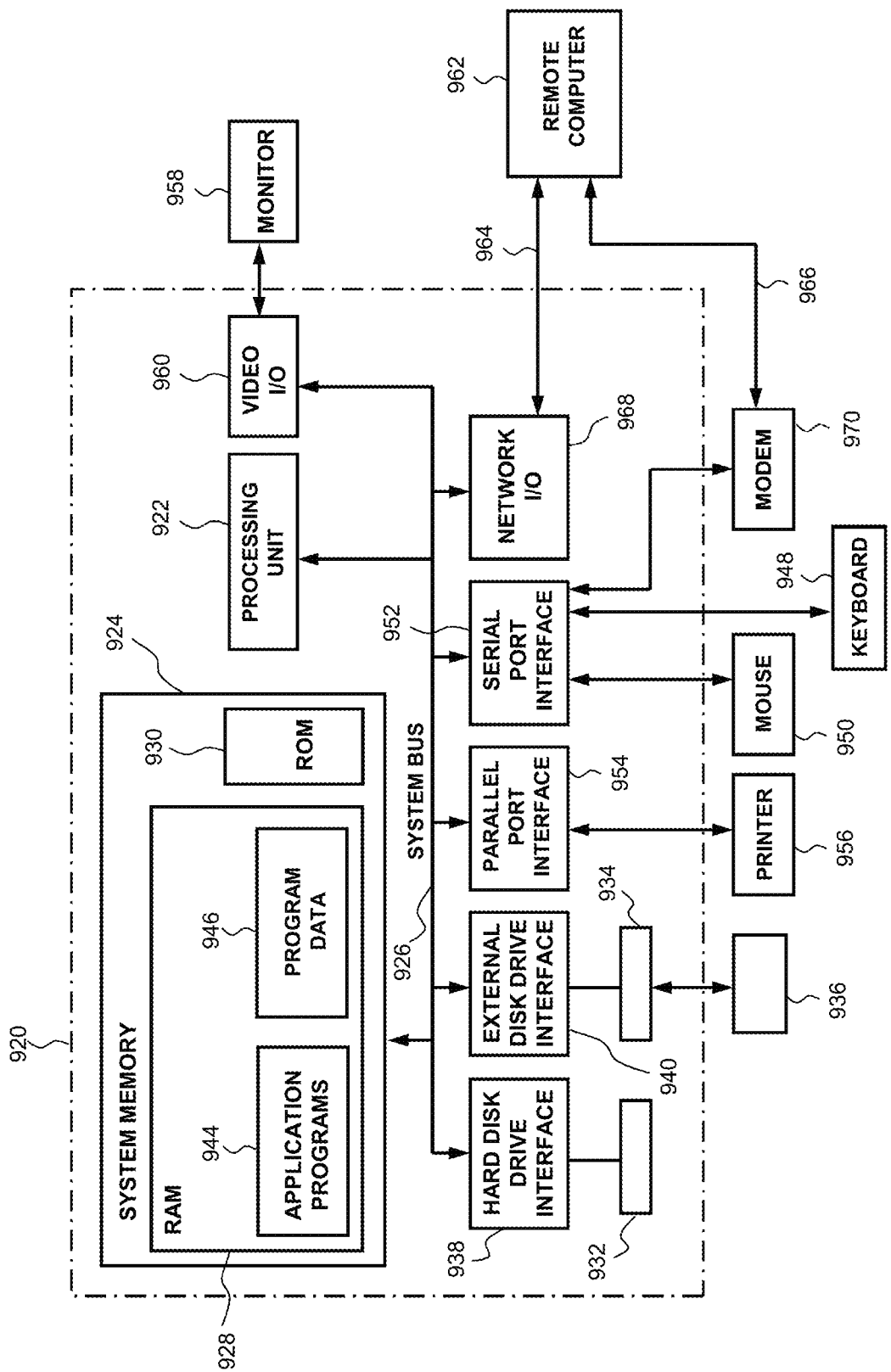
FIG. 3 depicts a computer system that can be used to implement aspects of the described subject matter.

FIG. 3 shows an exemplary system, for implementing aspects described herein, including a computing device in the form of a computing environment 920 (e.g. a personal computer or a mobile device). The computing environment includes a processing unit 922, a system memory 924, and a system bus 926. The system bus couples various system components including the system memory 924 to the processing unit 922. The processing unit 922 may perform arithmetic, logic and/or control operations by accessing the system memory 924. The system memory 924 may store information and/or instructions for use in combination with the processing unit 922. The system memory 924 may include volatile and non-volatile memory, such as a random access memory (RAM) 928 and a read only memory (ROM) 930. A basic input/output system (BIOS) containing the basic routines that helps to transfer information between elements within the computing environment 920, such as during start-up, may be stored in the ROM 930. The system bus 926 may be any of several types of bus structures including a memory bus or memory controller, a peripheral bus, and a local bus using any of a variety of bus architectures.

The computing environment 920 may further include a hard disk drive 932 for reading from and writing to a hard disk (not shown), and an external disk drive 934 for reading from or writing to a removable disk 936. The removable disk 936 may be a magnetic disk for a magnetic disk driver or an optical disk such as a CD ROM for an optical disk drive. The hard disk drive 932 and the external disk drive 934 are connected to the system bus 926 by a hard disk drive interface 938 and an external disk drive interface 940, respectively. The drives and their associated computer-readable media provide nonvolatile storage of computer readable instructions, data structures, program modules and other data for the computing environment 920. The data structures may include relevant data for the implementation of the method for installing a first physical element on a second physical element, as described above. The relevant data may be organized in a database, for example a relational database management system or an object-oriented database management system.

Although the exemplary environment described herein employs a hard disk (not shown) and an external disk 936, it should be appreciated by those skilled in the art that other types of computer readable media which can store data that is accessible by a computer, such as magnetic cassettes, flash memory cards, digital video disks, random access memories, read only memories, and the like, may also be used in the exemplary operating environment.

A number of program modules may be stored on the hard disk, external disk 936, ROM 930 or RAM 928, including an operating system (not shown), one or more application programs 944, other program modules (not shown), and program data 946. The application programs may include at least a part of the functionality as depicted in FIGS. 1 and 2.

A user may enter commands and information, as discussed below, into the computing environment 920 through input devices such as keyboard 948 and mouse 950. Other input devices (not shown) may include a microphone (or other sensors), joystick, game pad, scanner, or the like. These and other input devices may be connected to the processing unit 922 through a serial port interface 952 that is coupled to the system bus 926, or may be collected by other interfaces, such as a parallel port interface 954, game port or a universal serial bus (USB). Further, information may be printed using printer 956. The printer 956, and other parallel input/output devices may be connected to the processing unit 922 through parallel port interface 954. A monitor 958 or other type of display device is also connected to the system bus 926 via an interface, such as a video input/output 960. In addition to the monitor, computing environment 920 may include other peripheral output devices (not shown), such as speakers or other audible output.

The computing environment 920 may communicate with other electronic devices such as a computer, telephone (wired or wireless), personal digital assistant, television, or the like. To communicate, the computer environment 920 may operate in a networked environment using connections to one or more electronic devices. FIG. 3 depicts the computer environment networked with remote computer 962. The remote computer 962 may be another computing environment such as a server, a router, a network PC, a peer device or other common network node, and may include many or all of the elements described above relative to the computing environment 920. The logical connections depicted in FIG. 3 include a local area network (LAN) 964 and a wide area network (WAN) 966. Such networking environments are commonplace in offices, enterprise-wide computer networks, intranets and the Internet and may particularly be encrypted.

When used in a LAN networking environment, the computing environment 920 may be connected to the LAN 964 through a network I/O 968. When used in a WAN networking environment, the computing environment 920 may include a modem 970 (e.g. a DSL or cable modem) or other means for establishing communications over the WAN 966. The modem 970, which may be internal or external to computing environment 920, is connected to the system bus 926 via the serial port interface 952. In a networked environment, program modules depicted relative to the computing environment 920, or portions thereof, may be stored in a remote memory storage device resident on or accessible to remote computer 962. Furthermore other data relevant to the method for installing a first physical element on a second physical element (described above) may be resident on or accessible via the remote computer 962. It will be appreciated that the network connections shown are exemplary and other means of establishing a communications link between the electronic devices may be used.

The above-described computing system is only one example of the type of computing system that may be used to implement the method for installing a first physical element on a second physical element.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related items, and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
    scanning, by an augmented reality system, a barcode associated with at least one of a first physical element or a second physical element;
    loading, by the augmented reality system and based on scanning the barcode, a model of the second physical element;
    recognizing, by the augmented reality system, the second physical element based on the model of the second physical element;
    projecting, by the augmented reality system, one or more images, of one or more elements to be installed, on the second physical element;
    detecting, by the augmented reality system, the first physical element;
    recognizing, by smart glasses of the augmented reality system, a shape of the first physical element;
    determining, by the augmented reality system and based on recognizing the shape of the first physical element, an identification of the first physical element,
        the first physical element being one of the one or more elements to be installed; and
    projecting, by the augmented reality system and based on determining the identification of the first physical element, an image, of the one or more images, corresponding to the first physical element on or in the second physical element.

2. The method of claim 1, further comprising:
    determining whether a user is touching a respective one of the first physical element or the second physical element, or
    determining whether a representation of the respective one of the first physical element or the second physical element corresponds to a respective one of a model of the first physical element or the model of the second physical element; and
    selecting the first physical element based on:
        determining that the user is touching the first physical element, or
        determining that the representation of the first physical element corresponds to the model of the first physical element.

3. The method of claim 2, further comprising:
    capturing the representation of the respective one of the first physical element or the second physical element via a sensor; and
    wherein determining whether the representation of the respective one of the first physical element or the second physical element corresponds to the respective one of the model of the first physical element or the model of the second physical element comprises:
  determining whether the representation of the respective one of the first physical element or the second physical element has a predetermined degree of similarity to the respective one of the model of the first physical element or the model of the second physical element.

4. The method of claim 1, wherein the augmented reality system comprises one or more of:
  a portable device;
  a projector for projecting images onto a surface; or
  a sensor for recognizing physical elements.

5. The method claim 4, wherein the augmented reality system comprises the sensor,
  the sensor including at least one of a stereo camera or an LED pattern projector.

6. The method of claim 1, further comprising:
  validating whether the first physical element has been correctly installed on the second physical element.

7. The method of claim 1, wherein at least one of the model of the second physical element or a model of the first physical element is at least one of:
  in three dimensions;
  vector-based; or
  based on raster graphics.

8. The method of claim 1, wherein the model of the second physical element is a first model;
  wherein at least one of the first model or a second model, of the first physical element, conveys one or more of:
    support for mechanical surfacing,
    underlying materials,
    dimension measurements,
    kinematics, or
    functional tolerances; and
  wherein at least one of the first model or the second model is a computer aided three dimensional interactive application.

9. The method of claim 1, wherein the shape is a first shape,
  wherein a second shape, of the image, graphically describes the first physical element,
  wherein a location of the image corresponds to a predetermined installation location for the first physical element, and
  wherein the predetermined installation location is listed in a work order.

10. The method of claim 6, wherein validating whether the first physical element has been installed correctly comprises:
  receiving an indication from a user that the first physical element has been installed via a voice command; and
  recognizing whether the first physical element is in a predetermined installation location on the second physical element.

11. The method of claim 1, wherein the second physical element is one of:
  an artificial satellite intended for spaceflight,
  a part of the artificial satellite,
  a vehicle,
  a part of the vehicle,
  a robot,
  a box, or
  an electronic controller,
  a part of the electronic controller.

12. The method of claim 1, wherein the first physical element is one of:
  a component, part, or piece of the second physical element, or
  an item to be placed within the second physical element.

13. The method of claim 1, wherein the first physical element is installed on or in the second physical element as part of a process of assembling the second physical element,
  wherein, after installation, the first physical element is to perform one or more functions in connection with other parts of the second physical element.

14. A non-transitory computer-readable medium storing instructions, the instructions comprising;
  one or more instructions that, when executed by one or more processors, cause the one or more processors to:
    scan a barcode associated with at least one of a first physical element or a second physical element;
    load, based on scanning the barcode, a model of the second physical element;
    recognize the second physical element based on the model of the second physical element;
    project one or more images, of one or more elements to be installed, on the second physical element;
    detect the first physical element;
    recognize, via smart glasses, a shape of the first physical element;
    determine, based on recognizing the shape of the first physical element, an identification of the first physical element,
      the first physical element being one of the one or more elements to be installed; and
    project, based on determining the identification of the first physical element, an image, of the one or more images, corresponding to the first physical element on or in the second physical element.

15. A system, comprising:
  one or more devices to:
    scan a barcode associated with at least one of a first physical element or a second physical element;
    load, based on scanning the barcode, a model of the second physical element from storage;
    recognize the second physical element based on the model of the second physical element;
    project one or more images, of one or more elements to be installed, on the second physical element;
    detect the first physical element;
    recognize, via smart glasses, a shape of the first physical element;
    determine, based on recognizing the shape of the first physical element, an identification of the first physical element,
      the first physical element being one of the one or more elements to be installed; and
    project, based on determining the identification of the first physical element, an image, of the one or more images, corresponding to the first physical element on or in the second physical element.

16. The system of claim 15, wherein the one or more devices are further to:
  determine whether a user is touching a respective one of the first physical element or the second physical element; or
  determine whether a representation of the respective one of the first physical element or the second physical element corresponds to a respective one of a model of the first physical element or the model of the second physical element; and select the first physical element based on:
: determining that the user is touching the first physical element, or
: determining that the representation of the first physical element corresponds to the model of the first physical element.

17. The system of claim 16, wherein the one or more devices are further to:
: capture the representation of the respective one of the first physical element or the second physical element via a sensor; and
: wherein the one or more devices, when determining whether the representation of the respective one of the first physical element or the second physical element corresponds to the respective one of the model of the first physical element or the model of the second physical element, are to:
:: determine whether the representation of the respective one of the first physical element or the second physical element has a predetermined degree of similarity to the respective one of the model of the first physical element or the model of the second physical element.

18. The system of claim 15, wherein the one or more devices are further to:
: validate whether the first physical element has been correctly installed on the second physical element.

19. The system of claim 18, wherein the one or more devices, when validating whether the first physical element has been installed correctly, are to:
: receive an indication from a user that the first physical element has been installed via a voice command; and
: recognize whether the first physical element is in a predetermined installation location on the second physical element.

20. The system of claim 15, wherein the shape is a first shape;
: wherein a second shape, of the image, graphically describes the first physical element;
: wherein a location of the image corresponds to a predetermined installation location for the first physical element; and
: wherein the predetermined installation location is listed in a work order.

* * * * *